March 3, 1936.  C. E. LINSCOTT ET AL  2,032,941
RUBBER FILM OR SHEET
Filed Feb. 7, 1935
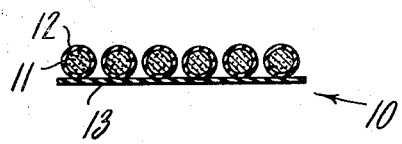
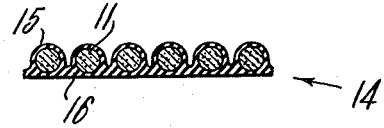
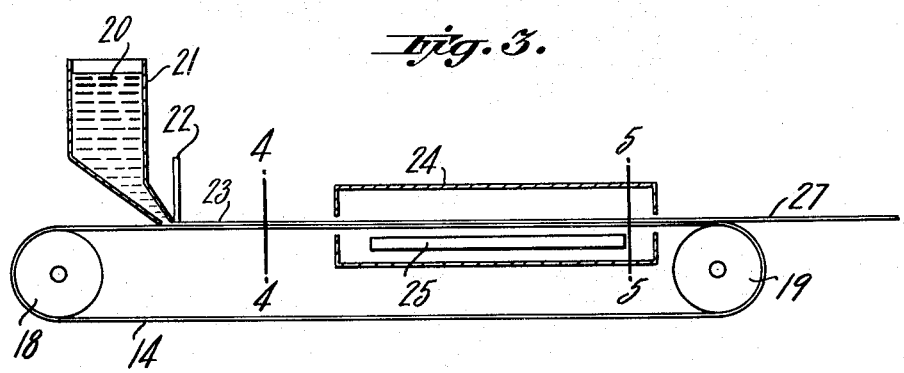
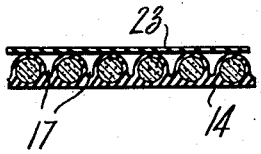
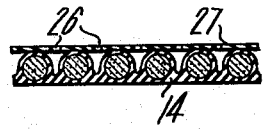
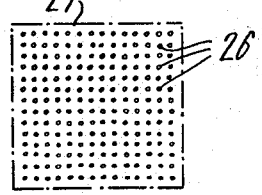
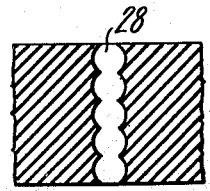
INVENTORS
Chester E. Linscott
Harold deBlois Rice
BY
ATTORNEY.

Patented Mar. 3, 1936

2,032,941

UNITED STATES PATENT OFFICE 2,032,941

RUBBER FILM OR SHEET

Chester E. Linscott, Ridgewood, N. J., and Harold de Blois Rice, Barrington, R. I., assignors to United States Rubber Company, New York, N. Y., a corporation of New Jersey Application February 7, 1935, Serial No. 5,408

17 Claims. (Cl. 154—48)

This invention relates to rubber films or sheets and more particularly to films or sheets of rubber derived directly from aqueous dispersions of rubber, such as latex, and having a multitude of minute perforations therethrough.

This application is a continuation-in-part of application Serial No. 662,454, filed March 24, 1933.

Sheet rubber containing predeterminately positioned perforations has been made by spreading latex onto a metal backing to dry and when at least partially dried or set impressing a patterned plate on the spread film to form the perforations corresponding to the impressions on the plate. Rubber sheetings containing perforations have also been made by spreading latex onto a suitably engraved plate, removing the latex from the relief parts of the plate by flowing or by the application of a squeegee, and then allowing the latex to dry. Instead of an engraved plate, a mold with suitably spaced projections on the surface has been used. It has further been suggested to use a metal or other electrical conducting sheet or mold with plugs or projections of insulating material for providing the desired projections in the finished sheet, and then electroplating a rubber film onto the backing sheet or mold in a known manner and drying the deposit to directly form the perforated sheeting. In all these processes, the perforations made in the rubber sheeting are necessarily relatively large by virtue of the limitations of the process of manufacture, and are easily visible to the naked eye. The patterned press plates of the first described process and the deposition backing for spreading or electroplating operations, as in the latter described processes, are further relatively expensive to manufacture.

Sponge-like and cellular rubber products have also been made from latex by drying latex compositions having air or gas entrapped in the latex itself. Such sponge-like rubber products may have pores interconnected throughout of a size as fine as desired, the mean size of the pores being more or less under the control of the operator, but the number and arrangement of the pores are outside the control of the operator. The sponge-like rubber products have a network of pores, in no sense of the word perforations, throughout similarly to ordinary sponge-rubber made by well known blowing agents in the conventional manner.

So-called micro-porous rubber products have also been made by setting latex to a gel in a mold of the desired shape, vulcanizing under non-evaporative conditions, and then removing the water.

The present invention relates to the production of perforate rubber films or sheets, more porticularly of the directly deposited solids of a latex composition, wherein there are a multitude of minute perforations extending linearly through the thickness of the film or sheet. The perforations may be made so small that in the unstretched film or sheet they are substantially invisible to the naked eye by transmitted light but clearly visible under low magnification. Such a film which appears superficially to be impervious permits "breathing" through it when applied to the body, yet retains the rubbery quality and to a remarkable extent the strength of similar rubber sheeting having no perforations.

In carrying out the invention, an air impermeable deposition backing having cavities or pits in its deposition surface, is spread with a latex composition so as to entrap air between the latex coating and the backing in the cavities or pits of the backing, and heating the backing to a temperature, which may be suitable for drying or gelling the latex, to cause the entrapped air to expand and force its way through the wet latex coating while it is drying or gelling to form permanent perforations therein. The coating, simultaneously with the heating of the backing and piercing of the jet of air, at least in the zones adjacent to the perforations, becomes sufficiently set so that the perforations are fixed. The drying may then be completed, and the spreading and heating operations repeated until the desired total thickness of coating has been built up. The perforations formed in the initial layer of the coating permit the perforation of the second and each succeeding layer in a similar manner, so that the perforations extend continuously thruogh the entire thickness of the coating. After the final drying, the perforated coating may be stripped from the backing, and may, if desired, be vulcanized in any convenient manner.

It has been found that concentrated latex compositions are particularly suitable for use in carrying out the process, for example, latex compositions of 45 to 60% solids content. The characteristics of such compositions by virtue of which the results described are best obtained are believed to be their relatively high viscosity and yield point, whereby the wet coating does not immediately flow into and fill up the cavities in the backing nor the perforations in previous coatings when spread, and their susceptibility to gelling under the influence of heat which helps to maintain fixed the perforations formed by the escape of the entrapped air. These properties may be enhanced in various ways well known in the art. For example, the viscosity and yield point may be increased by the admixture of suitable amounts of various thickening agents, such as hydrophilic colloids,—exemplified by colloidal clays, starches, gelatin, and vegetable gums capable of being swollen by water;—or salts, oxides, or hydroxides of multivalent metals such as zinc, aluminum, calcium, etc., or aryl-substituted guanidines, and many other types of compounds, which may also be employed in such amounts that they are inert or have no substantial effect on the viscosity at room temperature but gel the latex at elevated temperatures. Other methods of enhancing the heat-sensitivity of the latex may be employed, such as by the admixture of inert substances which decompose, or interact with other substances present, at elevated temperatures to form coagulants in the latex; or by the admixture of a coagulant together with a protective agent which ceases to be effective at elevated temperatures.

The concentrated latex compositions may have a wide range of viscosities, preferably from two to twenty-five times the viscosity of normal latex, or having a viscosity of from about 80 to about 1000 centipoises (rotating cylinder method).

The backing may be of any shape to produce the desired perforate rubber film. In the production of perforate rubber sheeting for example, the deposition backing may conveniently take the form of an endless belt as shown in the drawing.

In the drawing:

Figure 1 is a cross section through a deposition backing made by a two step process;

Figure 2 is a cross section through a deposition backing made by a one step process;

Figure 3 illustrates more or less diagrammatically apparatus for producing perforate rubber sheeting;

Figure 4 is a section on line 4—4 of Fig. 3 using the blanket of Fig. 2;

Figure 5 is a section on line 5—5 of Fig. 3;

Figure 6 is an enlarged view of a piece of perforate sheeting made according to the invention; and Figure 7 is a highly magnified view of a cross section of a piece of sheeting through a perforation.

By way of illustration only, and without intention to unduly limit the invention, the manufacture of perforate rubber sheeting will be described in detail, it being obvious that articles of the desired shape, other than sheeting, may be made with the desired shape of deposition backing.

There are various ways of preparing satisfactory air impermeable deposition backings. Preferably a woven fabric is coated with rubber in such a manner that the component threads of the fabric are impregnated and/or coated with rubber, and the rubberized fabric preferably has a thin layer of air-impermeable rubber over its lower face, whereby the weave of the fabric on the lower face only may be masked; that is, the meshes of the fabric are closed on one side of the fabric and are open on the other side, and the individual interstices are also sealed off, each from the other by the coating and/or impregnation of the threads. The meshes, being thus sealed on all sides but one, provide a multitude of pockets opening upon the upper face or deposition surface of the coated fabric.

The impregnating and/or coating of the threads and the provision on the under face of the fabric of an air impervious coating to provide a deposition backing may be effected in various ways as illustrated in the drawing.

Figure 1 illustrates a deposition backing 10 made by a two-step process wherein the component threads 11 of a woven fabric are impregnated and/or coated with rubber as at 12 by a spreading operation wherein a rubber dispersion or cement is driven into and through the fabric as by pressure with a spreading knife, the component threads being impregnated and/or coated but the meshes remaining partly open. To one face of the treated fabric is applied a smooth layer of air impervious rubber 13 either by spreading a rubber dispersion or cement to that face without driving the material through the meshes between the impregnated or coated threads, or by rolling or pressing the open-mesh rubberized fabric onto a preformed sheet of rubber, using an adhesive therebetween, if necessary.

Figure 2 illustrates a deposition backing 14 made by a one-step process wherein an advancing woven fabric is spread on one side with a rubber dispersion such as latex and the latex is driven from the spread surface through the interstices of the fabric to the opposite face to produce a fabric impregnated throughout and coated on both sides with the latex, and thereafter scraping the latex from one surface, preferably the spread surface, so that the component threads 11 are coated or impregnated with latex 15 without masking the weave of the fabric on that surface, and smoothing the latex coating on the opposite face to form an air impervious layer 16, all as described and claimed in a copending application of Chester E. Linscott, Serial No. 5,407, filed February 7, 1935.

For example, a "4.75 cotton sheeting" (4.75 running yards per pound of 39 inch width), having a thread count of 68×72 (threads per inch of warp and weft, respectively) has been found to be a satisfactory fabric for making the deposition backing. A vulcanizable latex composition such as the following, may be used for impregnating and/or coating the component threads of the fabric and for providing the air impermeable back on the same either in one or two steps as above described:

| | |
|---|---|
| Rubber (as twice creamed latex 60%) | 100 |
| Formaldehyde | 2.5 |
| Sodium isopropyl naphthalene sulfonate | 1.25 |
| Water | 5.0 |
| Oleic acid | 2.0 |
| 2,2-di-p-phenylol-propane | 2.0 |
| Water | 18.0 |
| Ammonium hydroxide (28%) | 5.0 |
| Stearic acid | .25 |
| Bleached Montan wax | .1 |
| Casper wax | .75 |
| Water | 6.0 |
| Ammonium hydroxide (28%) | .5 |
| Whiting | 5.0 |
| Sulfur | 1.25 |
| Zinc dimethyl dithiocarbamate | .65 |
| Zinc oxide | .1 |
| Sodium isopropyl naphthalene sulfonate | .1 |
| Oleic acid | .1 |
| Ammonium hydroxide | .1 |
| Water | 4.5 |

This composition was compounded by mixing the various materials, the ingredients being added to the latex in groups as indicated above, the liquids as emulsions and the solids as a paste, and the whole diluted with water to a water content of 45 or 50%. The different ingredients of such a latex composition may be varied as well known in the art, or other latex compositions substituted, the above composition being merely cited as one example of a latex composition that has been found satisfactory for the purpose.

A deposition backing made from a "4.72 cotton sheeting" as above described will have in its surface about 4900 pits or cavities per square inch corresponding to the square spaces or interstices between the threads. The fabric treated according to the two-step or one-step processes described above may be dried, for example, by passing through a drying tunnel or over a drying table or drying drums, at a temperature of 180-200° F. When the fabric has been dried, and a separate layer of rubber applied to the back to form the air impermeable layer, if necessary, the material may then be vulcanized, for example by festooning and heating in a gaseous medium such as steam at atmospheric pressure, for example for 45 minutes at 225° F. in the case of the composition shown above. The vulcanized rubber deposition surface is preferably then given a superficial treatment with a halogen to harden it and to make it non-adherent to the latex subsequently to be spread on it in the preparation of the perforated sheeting. The vulcanized surface may be halogenated and hardened by treatment with, for example, a 7½ percent solution of sulphur chloride in carbon tetrachloride, followed by a treatment with a 2 to 3 percent solution of bromine in carbon tetrachloride; or with the bromine solution alone, or with a mixture of the two solutions.

Other latex compositions, which may be unvulcanized, with or without any desired vulcanizing ingredients, or pre-vulcanized, may be used. If desired, the vulcanizing ingredients may be such that a partial cure, or "kick", will be imparted to the rubber during the drying of the coating, and the cure will be completed during storage of the roll. Other kinds of deposition backings, such as engraved metal backings, may be used in the case of small forms, but are expensive and difficult to make, and in the case of a long deposition backing in the form of an endless sheet almost impossible to manufacture by hand since the number of holes to be equivalent to a backing made from a "4.75 cotton sheeting" as described above, would be over six million per square yard. Metal sheeting having pits or cavities stamped or impressed therein also provides a suitable deposition backing.

In making the perforate rubber film or sheet, an aqueous rubber dispersion, such as a latex composition, is spread on the deposition surface of the backing or liner, preferably a surface-halogenated rubber coated fabric as described above, by means of a spreader bar, and the coated liner is passed through a heated drying tunnel or the like to set and dry the spread latex coating. The latex is applied in a thickness sufficient to produce when dried a layer of rubber about .002 to .004 inch thick. In spreading the latex, which should have a fairly high viscosity compared to normal latex, as above described, air is entrapped in the pits or cavities of the surface of the liner, and when the spread backing or liner is heated on passing through the drying tunnel, the entrapped bodies of air individually expand and rise relatively slowly, that is to say, non-explosively, through the drying or gelling latex film and escape, leaving minute perforations corresponding to the pits or cavities in the backing surface. Apparently, as the expanding air forces its way through the drying latex film, the walls of the perforation being formed become sufficiently set so that the latex does not flow back and cover over or fill in the perforation. Also, owing to the non-flowing characteristics of rubber deposited directly from latex, the perforations are not closed up during subsequent manufacturing operations including vulcanization of the rubber by heat. The spreading on the liner by means of a spreader bar, or a dipping operation for a shaped deposition backing, entraps the air in the pits or cavities in the surface of the backing, and the high viscosity and yield value of the latex prevent escape of the air until the subsequent heating of the backing and consequent expansion of the entrapped air while the film is being dried are effected. If desired, a volatile liquid, preferably a non-solvent of rubber, may be applied to the backing before application of the latex composition and such liquid will volatilize and expand through the latex film on heating, and form the desired perforations therein.

Several consecutive coatings may be spread on the liner to produce a perforate film or sheet of the desired thickness, each coating being dried before the subsequent one is applied. After the first coating, the air entrapped in the pits or cavities of the backing surface is guided by the perforation previously made, which perforation acts as a funnel and becomes extended through the newly applied coat. In the case where the liner is in the form of an endless belt, a continuous sheet formed by a single spreading operation may be produced, or the desired number of coats may be applied and a finished sheet of the desired thickness cut and stripped from the liner. The backing may, however, be in the form of a roll which is taken up after each coating and drying operation, and unrolled for each subsequent operation. Since such a backing is usually rolled up while still warm after each spreading and drying cycle, it is desired to cool the backing between such successive cycles in order that a sufficient difference may be obtained between the temperature of the backing while it is being spread, and the drying temperature, so as to properly expand the entrapped air. The same object may be accomplished by having increasing drying temperatures for successive coats of latex to compensate for the residual heat from prior drying operations.

Whether one or a plurality of spreading operations is employed in forming the perforate film or sheeting, the perforations extend substantially linearly through the film from one surface to the opposite surface thereof. The thickness of sheet obtainable by this process while maintaining the continuity of the perforations therethrough ranges from .002 inch to at least .050 inch.

After the desired thickness of perforate sheeting has been built up on the liner or backing, and the final coating has dried, the deposit is preferably stripped from the backing, and may be finished as by dusting and vulcanizing if desired.

The latex for the perforate sheeting should have a solids content at least equal to that of normal latex, and is preferably of 35 to 65% total solids content. It may be purified as by creaming or centrifuging, and compounded as desired, but should be of sufficient viscosity to properly entrap the air in the pits or cavities on the backing surface on spreading and to allow the air to force its way through and escape relatively slowly during the heating and drying operation. The latex may be unvulcanized, with or without vulcanizing ingredients, or it may be pre-vulcanized. The term "latex" is intended to include artificial dispersions of rubber and rubber-like materials.

Referring more particularly to the drawing, Fig. 3 illustrates more or less diagrammatically an apparatus and a method for producing the perforate sheet, wherein 14 represents the deposition backing or liner shown in Fig. 2, containing the cavities or pits 17 corresponding to the spaces or interstices between the threads, as shown in detail in Figs. 4 and 5. The deposition backing or liner 14 is in the form of an endless belt passing around pulleys 18 and 19 and is driven by mechanical means not shown.

The latex 20 is spread onto the travelling deposition backing or liner from a reservoir 21 by means of a spreader bar 22 forming a film 23 on the backing, which film entraps air in the cavities or pits on the surface of the backing as shown in Fig. 4. The backing spread with the desired thickness of latex passes through a drier 24 shown conventionally with a heating unit 25 below the travelling deposition backing. As the coated backing passes through the drier, the spread latex film dries and during the drying operation the air entrapped in the pits or cavities of the backing surface expands and escapes through the latex film and forms perforations 26 in the film which by virtue of the viscosity and yield value of the latex and the setting or gelling of the same are not covered over or filled in, as shown in Figs. 5 and 6. The perforate rubber sheet 27 thus formed may be stripped from the liner for subsequent treatment in the form of a continuous length. If desired, several coatings may be applied to build up the sheet to the desired thickness, the perforations formed in the initial layer of the coating permitting the perforation of the second and each succeeding layer in a similar manner, so that the perforations extend continuously throughout the entire thickness of the coating, and then a sheet the length of the backing removed from the same. Figure 6 is an enlarged view of a one-fourth inch square of a vulcanized rubber sheeting in unstretched condition made on a deposition backing of rubber-coated 4.75 cotton fabric as above described.

If desired, the pockets between the threads of the backings of Figs. 1 and 2, for example, may be partially closed across the tops by spreading a latex film over the same before the backing is vulcanized and perforating the film by heating the backing in a manner similar to that illustrated in Figs. 4 and 5 for the manufacture of the perforate film or sheet. The backing with the perforate film or layer integral with it may then be vulcanized and the outer surface halogenated as above described. In such a case the deposition backing or blanket has the appearance of Fig. 5 and the top perforate layer thereof provides the deposition surface for the subsequent manufacture of perforate films or sheets, and the pockets or pits of the deposition backing have the form of bulbous or flask-shaped cavities. By this method the air in the pits or cavities will act through a smaller opening to pierce the latex layer of the first spread coat in making the perforate film or sheet.

By using various woven backings properly coated, and latices of the proper viscosity, and by careful control of the drying temperatures, perforate rubber films may be made with perforations therethrough from almost a microscopic size, e. g. 0.01 millimeter (.0004 inch), up to about 0.2 millimeter (0.008 inch) or larger in diameter, and from 1000 or less up to 10,000 or more perforations per square inch in number. The perforate sheet material with the smaller sizes of perforations may have, in the unstretched condition, the superficial appearance of an ordinary rubber film or sheet, the perforations being substantially invisible to the naked eye by transmitted light. Under a low magnification, such as four times, or under an ordinary thread counter used in textile work, the perforations are clearly visible, and in end view or as looked at from the surface of the sheet appear round. Under high magnification, a perforation as looked at from the top or outer surface of the film or sheet, as made, has a more or less ragged appearance which is due to the internal structure of the perforations. A cross sectional view of a perforation, by which of course is meant a cross section through the sheet surrounding a perforation, under low magnification has the appearance of a straight cylindrical passage; under high magnification it has the appearance of a series of continuously interconnected and roughly spheroidal cavities 28 as shown in Fig. 7, if the film or sheet has been produced by a number of coatings, the perforation through each successive layer or coating having partly closed over after the bursting through of the heat-expanded entrapped air bubble. If, of course, the film or sheet has been made in one spreading operation, the perforation has, under high magnification, the appearance of a single roughly spheroidal cavity opening upon both surfaces of the sheet.

Unvulcanized perforate sheet material made according to the present invention from creamed latex free from vulcanizing ingredients is well adapted for surgical bandages, the perforations allowing free breathing of the covered portion of the body, and the rubber being sufficiently sticky to adhere to itself but not to skin, hair, or clothing. On the other hand, a perforate rubber sheet may be made from a latex of a composition the same as or similar to that shown above in the preparation of the backing itself, and such sheet after the desired number of coatings have been spread and dried may be stripped from the backing or liner and vulcanized. Such a vulcanized sheeting may be used in the manufacture of non-adhesive vulcanized bandages, and in the manufacture of foundation garments and sanitary goods, such as dress shields, baby pants, and the like, and stockings, sweat shirts, supporters, under garments, bathing suits and the like, where also the structure of the rubber sheet allows free "breathing" of the covered part of the body. It may also be used in the manufacture of air filters, as in vacuum cleaner bags, gas masks and the like and of strainers and filters for liquids and finely divided solids. Such a vulcanized sheet may also be used in the manufacture of a new type of raincoat containing no fabric, the perforate sheeting being showerproof due to the fineness of the perforations, yet very much cooler than ordinary rubber sheeting.

The latex may alternatively be compounded to form when vulcanized hard rubber or ebonite, as is well known in the art, and the hard rubber perforate sheet used as separators in storage batteries and for other uses where porous diaphragms are required.

With the above detailed disclosure of the invention, it is evident that numerous modifications will suggest themselves to those skilled in the art, and it is not desired to limit the invention otherwise than as set forth in the appended claims.

Having thus described our invention, what we claim and desire to protect by Letters Patent is:

1. A perforate rubber film or sheet having a multitude of minute perforations extending linearly therethrough, which in the unstretched film or sheet are substantially invisible to the naked eye by transmitted light but which are clearly visible by transmitted light under low magnification, and which in the unstretched film or sheet, each have at least at high magnification the appearance in cross section of a series of continuously and linearly interconnected roughly spheroidal cavities.

2. A perforate rubber film or sheet the perforations of which, in the unstretched film or sheet, each have at least at high magnification the appearance in cross section of a series of continuously and linearly interconnected roughly spheroidal cavities.

3. A perforate rubber film or sheet the perforations of which, in the unstretched film or sheeting, each have at least at high magnification the appearance in cross section of a series of continuously and linearly interconnected roughly spheroidal cavites, said perforations having an average diameter of 0.01–0.2 millimeter.

4. A perforate rubber film or sheet the perforations of which, in the unstretched film or sheeting, each have at least at high magnification the appearance in cross section of a series of continuously and linearly interconnected roughly spheroidal cavities, said perforations having an average diameter of 0.01–0.2 millimeter, and numbering 1000 to 10,000 per square inch.

5. A perforate rubber film or sheet of the directly deposited solids of a latex composition having a plurality of perforations extending linearly therethrough, each having at least at high magnification the appearance in cross section of a series of continuously and linearly interconnected roughly spheroidal cavities.

6. A perforate rubber film or sheet of the directly deposited solids of a latex composition having a multitude of minute perforations extending linearly therethrough, the perforations of which, in the unstretched film or sheeting, each have at least at high magnification the appearance in cross section of a series of continuously and linearly interconnected roughly spheroidal cavities, said perforations having an average diameter of 0.01–0.2 millimeter.

7. A perforate rubber film or sheet of the directly deposited solids of a latex composition having a multitude of minute perforations extending linearly therethrough, the perforations of which, in the unstretched film or sheeting, each have at least at high magnification the appearance in cross section of a series of continuously and linearly interconnected roughly spheroidal cavities, said perforations having an average diameter of 0.01–0.2 millimeter, and averaging in number at least 1000 per square inch.

8. An article composed at least in part of a perforate rubber film or sheet of the directly deposited solids of a latex composition having a plurality of perforations extending linearly therethrough, the perforations of which, in the unstretched film or sheeting, each have at least at high magnification the appearance in cross section of a series of continuously and linearly interconnected roughly spheroidal cavities, said perforations having an average diameter of 0.01–0.2 millimeter.

9. A perforate rubber film or sheet of the directly deposited solids of a latex composition having a multitude of minute perforations extending linearly therethrough, which in the unstretched film or sheet are substantially invisible to the naked eye by transmitted light but which are clearly visible by transmitted light under low magnification, and which in the unstretched film or sheet, each have at least at high magnification the appearance in cross section of a series of continuously and linearly interconnected roughly spheroidal cavities.

10. A rubber film or sheet having a multitude of minute perforations extending substantially linearly therethrough which in the unstretched film or sheet are substantially invisible to the naked eye by transmitted light but clearly visible under low magnification.

11. A rubber film or sheet of the directly deposited solids of a latex composition and having a multitude of minute perforations extending substantially linearly therethrough which in the unstretched film or sheet are substantially invisible to the naked eye by transmitted light but clearly visible under low magnification.

12. A perforate rubber film or sheet the perforations of which extend linearly therethrough and have, in the unstretched film or sheet, an average diameter of 0.01–0.2 millimeter.

13. A perforate rubber film or sheet the perforations of which, in the unstretched film or sheet, each have at least at high magnification the appearance in cross section of a series of continuously and linearly interconnected roughly spheroidal cavities, said perforations averaging in number at least 1000 per square inch.

14. A perforate rubber film or sheet the perforations of which extend linearly therethrough and, in the unstretched film or sheet, average in number at least 1000 per square inch and have an average diameter of 0.01–0.2 millimeter.

15. A perforate rubber film or sheet of the directly deposited solids of a latex composition, the perforations of which extend linearly therethrough and have, in the unstretched film or sheet, an average diameter of 0.01–0.2 millimeter.

16. A perforate rubber film or sheet of the directly deposited solids of a latex composition, the perforations of which extend linearly therethrough and, in the unstretched film or sheet, average in number at least 1000 per square inch.

17. A perforate rubber film or sheet of the directly deposited solids of a latex composition, the perforations of which extend linearly therethrough and, in the unstretched film or sheet, average in number at least 1000 per square inch and have an average diameter of 0.01–0.2 millimeter.

CHESTER E. LINSCOTT.
HAROLD de BLOIS RICE.